US009693286B2

(12) United States Patent
Ward et al.

(10) Patent No.: US 9,693,286 B2
(45) Date of Patent: *Jun. 27, 2017

(54) EMISSION CONTROL FOR WIRELESS LOCATION MANAGEMENT

(71) Applicant: Location Sentry Corp, Camas, WA (US)

(72) Inventors: Matthew L. Ward, Collegeville, PA (US); Craig E. Spiegelberg, Washougal, WA (US)

(73) Assignee: Location Sentry Corp., Camas, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/276,407

(22) Filed: Sep. 26, 2016

(65) Prior Publication Data

US 2017/0013538 A1     Jan. 12, 2017

Related U.S. Application Data

(63) Continuation of application No. 14/281,799, filed on May 19, 2014, now Pat. No. 9,467,804, which is a continuation-in-part of application No. 14/207,417, filed on Mar. 12, 2014, now abandoned.

(60) Provisional application No. 61/855,652, filed on May 20, 2013.

(51) Int. Cl.
| *H04W 12/02* | (2009.01) |
| *H04W 4/02* | (2009.01) |
| *H04W 48/02* | (2009.01) |
| *H04W 12/12* | (2009.01) |
| *H04W 12/06* | (2009.01) |
| *H04L 29/06* | (2006.01) |
| *H04W 4/00* | (2009.01) |
| *H04W 84/12* | (2009.01) |

(52) U.S. Cl.
CPC ............. *H04W 48/02* (2013.01); *H04W 4/02* (2013.01); *H04W 12/06* (2013.01); *H04W 12/12* (2013.01); *H04L 63/145* (2013.01); *H04L 63/1466* (2013.01); *H04W 4/008* (2013.01); *H04W 84/12* (2013.01)

(58) Field of Classification Search
CPC ............. G06F 21/10; G11B 20/00086; G11B 20/0021; H04L 63/0428; H04L 63/1466; H04L 63/145; H04N 21/4405; H04W 4/02; H04W 12/12
USPC .......................................................... 726/26
See application file for complete search history.

(56) References Cited

U.S. PATENT DOCUMENTS

| 2009/0094349 A1* | 4/2009 | Smith | H04L 12/66 709/220 |
| 2009/0319435 A1* | 12/2009 | Little, Jr. | G06F 21/577 705/76 |
| 2012/0167207 A1* | 6/2012 | Beckley | H04W 4/001 726/22 |

* cited by examiner

*Primary Examiner* — Baotran N To

(57) ABSTRACT

An emission control scheme intended to limit the localization and identification of a wireless device to known friendly wireless networks. Use of an intelligent access control (IAC) on a wireless device allows the user or administrator control over the revealing of the wireless device to any particular network. Passive scanning allows collection of network information while passive device-based location and onboard databased information on the wireless networks allows localization to thwart network spoofing for unfriendly positioning and identification of the wireless device.

11 Claims, 4 Drawing Sheets

EMISSION CONTROL FOR WIRELESS LOCATION MANAGEMENT

CROSS REFERENCE AND RELATED APPLICATIONS

This application is a continuation of U.S. patent application Ser. No. 14/281,799 (Now U.S. Pat. No. 9,467,804), filed on May 19, 2014 titled EMISSION CONTROL FOR WIRELESS LOCATION MANAGEMENT by WARD, Matthew L. et al., the entire disclosure of which is incorporated herein by reference.

FIELD OF THE INVENTION

The invention relates to a method and apparatus for preventing the disclosure location of a wireless device generally and, more particularly, but not exclusively, to a use of passive radio receivers in the wireless device to determine network identity and location of the wireless device.

BACKGROUND OF THE INVENTION

With the explosive growth in mobile devices, wireless data rates and mobile-based software applications, the security and privacy needs of the user of wireless devices such as smartphones, tablet computers, and wireless LAN-equipped netbooks, laptop portable computers or voice-over-IP phones with nomadic capabilities have been overlooked. The existing security models wireless networks and wireless device were designed for ease of access and mobility, not for privacy and security. Therefore, what is needed is a system and method that provides user with privacy and security.

SUMMARY OF THE INVENTION

A system and method are provided in accordance with the various aspects of the invention that give a user a higher level of privacy and control. In accordance with the various aspects of the invention, the system and method include an intelligent access control agent on a wireless device. The control agent allows the user or administrator control over the revealing of the wireless device to any particular network. Passive scanning allows collection of network information while passive device-based location allows localization to thwart network spoofing.

The foregoing is a summary and thus contains, by necessity, simplifications, generalizations and omissions of detail. Those skilled in the art will appreciate that the summary is illustrative only and is not intended to be in any way limiting. The inventive techniques and concepts described herein apply to wireless communications systems including the radio access systems of GSM, UMTS, LTE, LTE-Advanced, IEEE 802 (WiFi, WiMAN, WiMAX), Bluetooth, UWB and NFC.

BRIEF DESCRIPTION OF THE DRAWING

The foregoing summary as well as the following detailed description is better understood when read in conjunction with the appended drawings. For the purpose of illustrating the various aspects and embodiments of the invention, there is shown in the drawings exemplary constructions of the invention. However, the invention is not limited to the specific methods and instrumentalities disclosed. In the drawings.

DETAILED DESCRIPTION OF ILLUSTRATIVE EMBODIMENTS

Illustrative embodiments as found in the various aspects of the invention are discloses with reference to the figures, wherein like numeral refer to like features. Wireless devices have evolved in both operation and form-factors, converging the personal computer (PC) with the cellular phone, pager, and other communications devices. Besides communications functions (e.g. Voice Telephony, Short-message-service (SMS), Multi-media Messaging Service (MMS), TCP/IP data connectivity) and upgraded general processing power, sensors have been added to the wireless device. For instance, a wireless device (e.g. a smartphone, feature phone, netbook, Personal Digital assistant (PDA), tablet computer or PC with wireless LAN capability) may include:
  Camera/Video functions;
  Location data (Satellite-based);
  Location data (Mobile-based);
  Location data (Network-based);
  Motion data (e.g. compass, accelerometer);
  Capacitive Sensors;
  Address Book, Contacts lists, recent called/emailed data; and
  Application specific sensing, reading and monitoring capabilities.

A single site location based on the geographic location of the wireless network transmission antenna and the beacon ID (e.g. BTS ID, Cell ID, SSID) may be developed either by the wireless device 10 or the network; use of timing information of the signal path between the wireless device 10 and network may allow enhancement of the single site location. Using several beacon identities and power levels potentially may increase accuracy over a single site location using a power-difference-of-arrival technique.

Databases of beacon identifiers, beacon power levels, and network transmitter geographical locations may be uploaded to the wireless device allowing for use of the aforementioned techniques using just the passive receiver(s) of the wireless device. A transmission (or series of transmissions) from the wireless device is enough to localize a transmitter. An interaction of the wireless device with the network where identifiers either physical (e.g. Electronic Serial Number, Media Access Control (MAC) address); or virtual (e.g. Temporary Mobile Station Identifier (TMSI) or IP address) can allow both localization and identification of the wireless device. Therefore, Prevention of the localization of the wireless device 10 by unfriendly networks or rogue base stations/access points requires emission control at the wireless device 10 in the form of intelligent access control.

Figure 1:
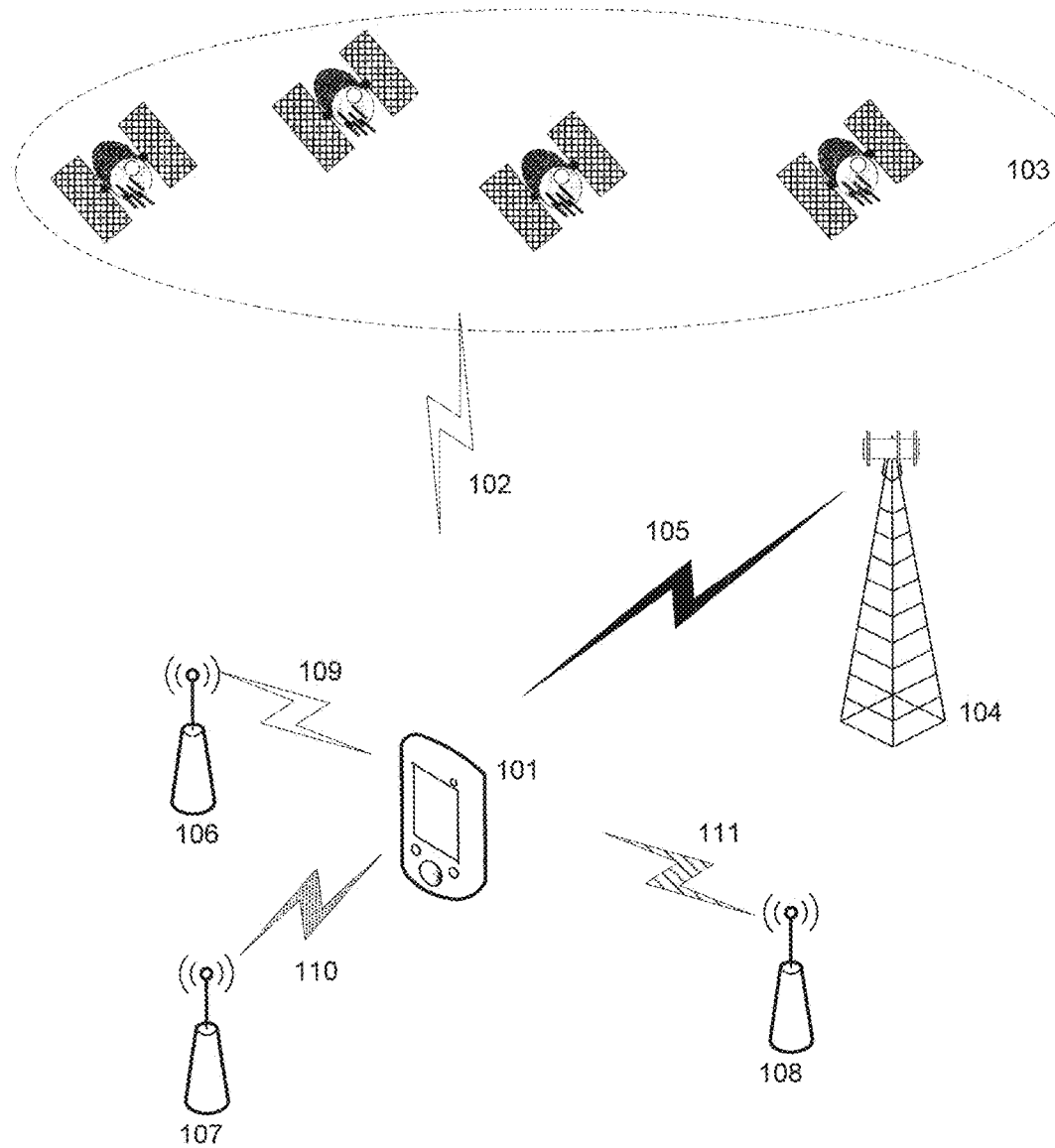
FIG. 1 shows a device within a wireless environment in accordance with the various aspects and embodiments of the invention.

Referring now to FIG. 1, in accordance with the aspects of the invention, an exemplary instance of an Intelligent Access Control (IAC) system is shown. The IAC system uses the receivers of the wireless device 101, which is similar to the wireless device 10 of FIG. 4, to passively collect information about the available networks, current location and a network clearance list before initiating a communications session. The wireless device 101 has been preset with a database of cleared networks and the physical geospatial service area(s) of those networks. Each receiver in the wireless device 101 may have its own list of networks. Furthermore, while not shown, there may be multiple wireless devices, each of which will have its own database of cleared networks.

When powered on or entering the service area of a network, as determined from the network ID broadcast by the radio beacon(s) of the network 105 109, 110, and 111, the wireless device 101 passively determines its own location and then compares that location with the geo-spatial parameters for the network transmitters. Multiple on-board passive receivers may be used in the determination of a location using a first 104 and second 106, 107, and 108 network. It will be apparent to one skilled in the art that the number of networks involved can vary without deviating from the scope of the invention. Radio signaling 102 from a Global Navigation Satellite System (GNSS, e.g. the Navstar GPS system) 103 may also be used to position the wireless device 101.

If the geographic network service area and location are a match, then a communication session can begin. In accordance with the aspects of the invention, if the network ID and the location are a match, then the wireless device 101 will switch a particular communications transceiver out of passive mode and into active mode. Once out of passive mode, regular network access control and preferences come into play and the wireless device 101 authenticates and exchanges control and/or user data with the network as defined for that network type.

The database of cleared networks and the wireless networks physical geospatial service areas may contain permission lists for each network and for each service area of the network. For instance, in accordance with an aspect and one embodiment of the invention, networks maybe categorized as black, gray or white. The preferences can be set up as to: 1) always automatically connect to white; 2) require manual intervention to connect to gray; and 3) never connect to black. Connection to any network will be logged by the IAC system and cause a report to be generated to an administrator. Connection to a gray network may invoke a time limit, limitations on activation or use of onboard applications, or limit the type of communications (e.g. voice-only, voice/data encryption (virtual private networking) required).

Figure 2:
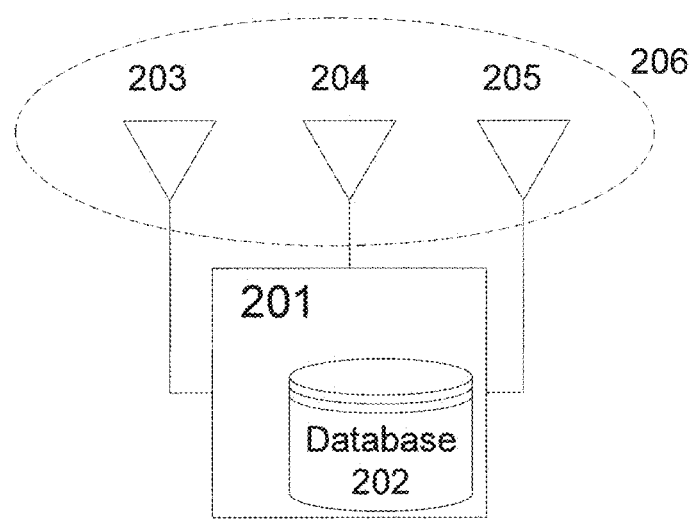
FIG. 2 shows functional elements of a device in accordance with the various aspects and embodiments of the invention.

Referring now to FIG. 2, in accordance with various aspects and embodiments of the invention, a wireless device 201 is shown. To allow location and identification of the wireless network transmitters, the wireless device 201 includes a database 202 containing the geographic coordinates of the wireless network transmitters. The database 202 may also contain transmission power levels, terrain data, radio propagation data and historical information to be used in the localization calculation.

The wireless device 201 includes an antenna array 206, in accordance with various aspects and embodiments of the invention. The antenna array 206, in accordance with some aspects and embodiments of the invention, includes separate antenna 203, 204, and 205 for each radio communications capability supported by the wireless device 201. Further aspects of the invention include an infrared transceiver port in the array 206. Use of 2 or more radio networks in a localization attempt serves to reduce the chances of spoofing the location by false satellite or beacon signals.

In a cellular example, IAC system is used to prevent a coarse location of the wireless device 201 by the cellular wireless network, wherein the wireless device 201 is located. The wireless device 201 enters the service area of a wireless network, either by movement or by being powered-on. The wireless device 201 passively sniffs the wireless bands for radio beacons in its immediate area, noting the power levels, mobile network identifiers and other broadcast information needed to access the wireless network. In this example, the wireless device 201 uses both its on-board GNSS receiver and wireless receiver to collect radio signals. The GNSS produced location, a combination of the GNSS and cell IDs may be used or the beacon ID(s), with onboard database of beacons and geographic location of each beacon, alone may be used for localization within the service area of the wireless network. As the detected network is allowable, and the location estimate is within the recorded geographic service area of the network, the wireless device 201 is allowed access to the network.

In a wireless LAN environment, the IAC system is used to prevent location of the wireless device 201 being gathered by the wireless LAN (W-LAN) e.g. a Wi-Fi network. The wireless device 201 enters the service area of a W-LAN, either by movement or by being powered-on. The wireless device 201 sniffs the W-LAN wireless bands for radio beacons in its immediate area, noting the power levels, the network identifiers (e.g. the Service Set Identifier (SSID)) and other broadcast information needed to access the W-LAN. In this example, the wireless device 201 uses both its cellular receiver and wireless LAN receiver to collect radio signals. The cellular receiver in parallel to the W-LAN receiver scans the spectrum to detect and collect beacon identifiers and received power levels.

A location for the wireless device may be produced using the cellular system information, the W-LAN information, or a combination of W-LAN and cellular information. An onboard database of cellular and W-LAN beacons and geographic location of each beacon is required for localization. Once a position has been determined, that position can be determined to be within the service area of the wireless network. If the detected network is allowable, and the location estimate is within the recorded geographic service area of the network, the wireless device 201 is allowed access and leaves passive mode.

Figure 3:
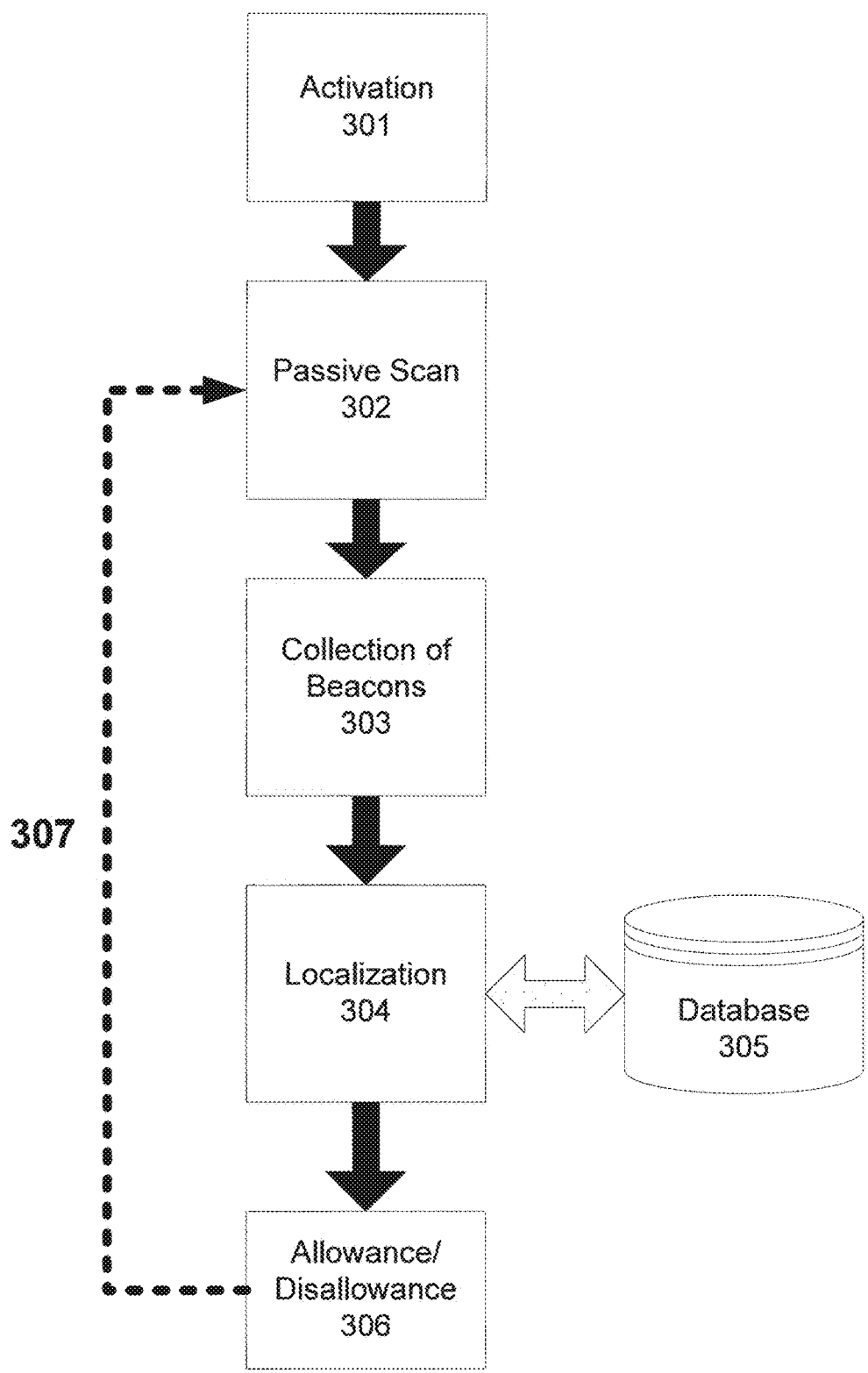
FIG. 3 illustrates a flow process that includes steps in intelligent access control in accordance with the various aspects and embodiments of the invention.

Referring now to FIG. 3, the operation of the IAC system residing as an agent in a device, such as the wireless device of FIG. 1, is shown in accordance with the various aspects and embodiments of the invention. Upon activation, at step 301, the agent locks the device, allowing only passive operation of all transceiver and transmitter systems. The agent then commands a passive scan, at step 302, of the radio spectrum used for mobile communications. The Agent collects information on all beacons detected, at step 303, from any of the receivers. The agent performs localization, at step 304, using satellite signaling and/or the received beacon information with the databased beacon and geographic information. If the calculated position is within the geographic service area of an allowed network, then active mode is allowed, at step 306. Otherwise the device is not allowed to go active and user intervention may be requested at step 306. If not allowed, then a re-scan may be activated, at step 307.

The identity of a device's user or owner may be ascertained from an identifier and access to public databases (e.g. mobile number and directory service) or may be developed from repeated network accesses by the wireless device with location. In accordance with the various aspects of the present invention, use of identification spoofing may be used by the wireless device 201 to authenticate the network anonymously before setting up a regular communications session. For instance, a wireless device using a Wi-Fi transceiver may use a false MAC address when probing the local Wi-Fi systems and then once a friendly network has been confirmed, the wireless device switches over to a true identity and re-accesses the network and proceeds with authentication.

In accordance with another aspect of the invention, a Bluetooth equipped device attempts to pair with a wireless device. Since the initialization key and, thus the link key, are based on the device ID, a mock ID could be used to establish a temporary link pairing allowing a communication channel to be formed where a more rigorous identification and authentication procedure (e.g. shared secret, challenge response) could be accomplished before breaking the link and re-establishing with real credentials.

In accordance with yet another aspect of the invention, a near-field-communications (NFC) equipped device is designed to be tracked. A random unique ID (UID) has been specified. The random UID designation occurs in a specific reserved range of four-byte UIDs starting with 0x08. The wireless device wishing to preserve location privacy could use a spoofed UID or one from the random range. If a random value is to be used, a listing of used UIDs would be established in the device to prevent reuse.

Figure 4:
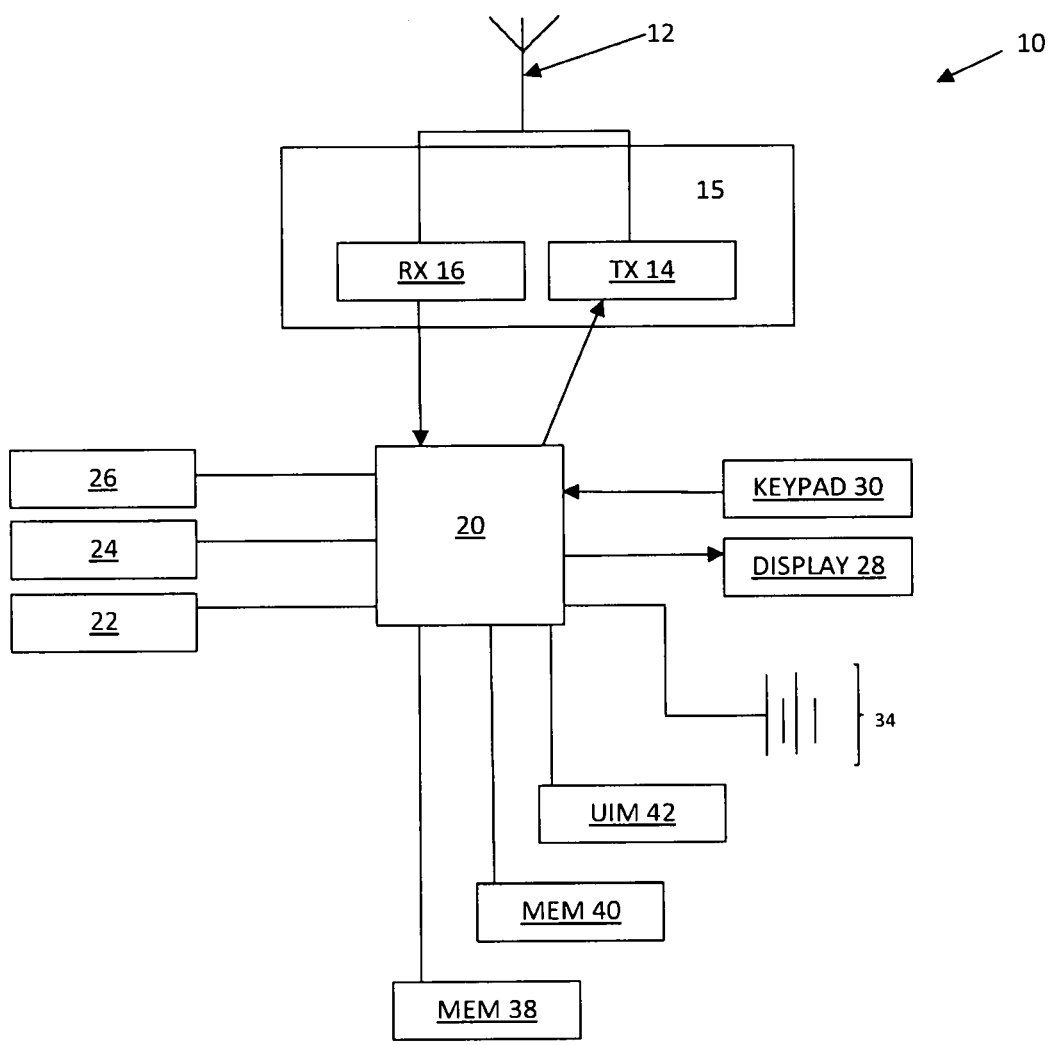
FIG. 4 is a block diagram of a device in accordance with one aspect and embodiment of the invention.

Referring now to FIG. 4, based on the various aspects of the invention, illustrates a block diagram of a wireless device 10, which may also be a mobile telephone or a mobile terminal. It should be understood, however, that the wireless device 10, as illustrated and hereinafter described, is merely illustrative of one type of wireless device and/or mobile device that would benefit from embodiments of the invention and, therefore, should not be taken to limit the scope of embodiments of the invention. While several aspects and embodiments of the wireless and mobile device are illustrated and will be hereinafter described for purposes of example, other types of mobile terminals, such as portable digital assistants (PDAs), pagers, mobile televisions, gaming devices, laptop computers, cameras, video recorders, audio/video player, radio, GPS devices, or any combination of the aforementioned, and other types of voice and text communications systems, can readily employ aspects and embodiments of the invention.

In addition, while several embodiments of the method of the invention are performed or used by a wireless device 10, the method may be employed by other than a mobile terminal. Moreover, the system and method of embodiments of the invention will be primarily described in conjunction with mobile communications applications. It should be understood, however, that the system and method of embodiments of the invention can be utilized in conjunction with a variety of other applications, both in the mobile communications industries and outside of the mobile communications industries.

The wireless device 10 includes an antenna 12 (or multiple antennae) in operable connection or communication with a transmitter 14 and a receiver 16 in accordance with one aspect of the invention. In accordance with other aspects of the present invention, the transmitter 14 and the receiver 16 may be part of a transceiver 15. The wireless device 10 may further include an apparatus, such as a controller 20 or other processing element, which provides signals to and receives signals from the transmitter 14 and receiver 16, respectively. The signals include signaling information in accordance with the air interface standard of the applicable cellular system, and also user speech, received data and/or user generated data. In this regard, the wireless device 10 is capable of operating with one or more air interface standards, communication protocols, modulation types, and access types.

By way of illustration, the wireless device 10 is capable of operating in accordance with any of a number of first, second, third and/or fourth-generation communication protocols or the like. For example, the wireless device 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with fourth-generation (4G) wireless communication protocols or the like. As an alternative (or additionally), the wireless device 10 may be capable of operating in accordance with non-cellular communication mechanisms. For example, the wireless device 10 may be capable of communication in a wireless local area network (WLAN) or other communication networks described below in connection with FIG. 1. The wireless device 10 can also have multiple networking capabilities including nomadic wired tethering, local-area-network transceivers (e.g. IEEE802 Wi-Fi), wide-area-network transceivers (IEEE 802.16 WiMAN/WiMAX, cellular data transceivers, (e.g. LTE) and short-range, data-only wireless protocols such as Ultra-wide-band (UWB), Bluetooth, RFID, Near-field-communications (NFC), etc.

It is understood that the apparatus, such as the controller 20, may include circuitry desirable for implementing audio and logic functions of the wireless device 10. For example, the controller 20 may be comprised of a digital signal processor device, a microprocessor device, and various analog to digital converters, digital to analog converters, and other support circuits. Control and signal processing functions of the wireless device 10 are allocated between these devices according to their respective capabilities. The controller 20 may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the wireless device 10 to transmit and receive Web content, such as location-based content and/or other web page content, according to a Wireless Application Protocol (WAP), Hypertext Transfer Protocol (HTTP) and/or the like, for example.

The wireless device 10 may also comprise a user interface including an output device such as a conventional earphone or speaker 24, a ringer 22, a microphone 26, a display 28, and a user input interface, all of which are coupled to the controller 20. The user input interface, which allows the wireless device 10 to receive data, may include any of a number of devices allowing the wireless device 10 to receive data, such as a keypad 30, a touch display (not shown) or other input device. In embodiments including the keypad 30, the keypad 30 may include the conventional numeric (0-9) and related keys (#, *), and other hard and soft keys used for operating the wireless device 10. Alternatively, the keypad 30 may include a conventional QWERTY keypad arrangement. The keypad 30 may also include various soft keys with associated functions. In addition, or alternatively, the wireless device 10 may include an interface device such as a joystick or other user input interface. The wireless device 10 further includes a battery 34, such as a vibrating battery pack, for powering various circuits that are required to operate the wireless device 10, as well as optionally providing mechanical vibration as a detectable output.

The wireless device 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the wireless device 10 may be equipped with memory. For example, the wireless device 10 may include volatile memory 40, such as volatile Random Access Memory (RAM) including a cache area for the temporary storage of data. The wireless device 10 may also include other non-volatile memory 42, which can be embedded and/or may be removable. The non-volatile memory 42 can additionally or alternatively comprise an electrically erasable programmable read only memory (EEPROM), flash memory or the like, such as that available from the SanDisk Corporation of Sunnyvale, Calif., or Lexar Media Inc. of Fremont, Calif. The memories can store any of a number of pieces of information, and data, used by the wireless device 10 to implement the functions of the wireless device 10. For example, the memories can include an identifier, such as an international mobile equipment identification (IMEI) code, capable of uniquely identifying the wireless device 10. Furthermore, the memories may store instructions for determining cell id information. Specifically, the memories may store an application program for execution by the controller 20, which determines an identity of the current cell, i.e., cell id identity or cell id information, with which the wireless device 10 is in communication.

Although not every element of every possible mobile network is shown and described herein, it should be appreciated that the wireless device 10 may be coupled to one or more of any of a number of different networks through a base station (not shown). In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a UMTS network employing WCDMA radio access technology. Some narrow-band analog mobile phone service (NAMPS), as well as total access communication system (TACS), network(s) may also benefit from embodiments of the invention, as should dual or higher mode mobile stations (e.g., digital/analog or TDMA/CDMA/analog phones).

The wireless device 10 can further be coupled to one or more wireless access points (APs) (not shown). The APs may comprise access points configured to communicate with the wireless device 10 in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like. The APs may be coupled to the Internet (not shown). The APs can be directly coupled to the Internet. In accordance with other aspects of the invention, the APs are indirectly coupled to the Internet. Furthermore, in one embodiment, the BS may be considered as another AP. As will be appreciated, by directly or indirectly connecting the wireless devices 10 to the Internet, the wireless device 10 can communicate with other devices, a computing system, etc., to thereby carry out various functions of the wireless device 10, such as to transmit data, content or the like to, and/or receive content, data or the like from other devices. As used herein, the terms "data," "content," "information" and similar terms may be used interchangeably to refer to data capable of being transmitted, received and/or stored in accordance with the various aspects and embodiments of the invention. Thus, use of any such terms should not be taken to limit the spirit and scope of embodiments of the invention.

Although not shown, the wireless device 10 may communicate in accordance with, for example, RF, BT, IrDA or any of a number of different wireline or wireless communication techniques, including LAN, WLAN, WiMAX, UWB techniques and/or the like. One or more of the computing systems that are in communication with the wireless device 10 can additionally, or alternatively, include a removable memory capable of storing content, which can thereafter be transferred to the wireless device 10. Further, the wireless device 10 can be coupled to one or more electronic devices, such as displays, printers, digital projectors and/or other multimedia capturing, producing and/or storing devices (e.g., other terminals). Furthermore, it should be understood that embodiments of the invention may be resident on a communication device such as the wireless device 10, or may be resident on a network device or other device accessible to the wireless device 10.

In accordance with the various aspects of the invention, the wireless device 10 includes on board location systems. While the on-board location systems (e.g. Global-Navigation-Satellite-System Receivers (GNSS)) may be used to develop a location estimate for the wireless device 10, the location of a wireless device 10 may be determined from the interaction (i.e. radio messaging) between the wires device 10 and the network (e.g. cellular system, WiMAN, WiMAX, WiFi, Bluetooth, NFC).

The true scope the invention is not limited to the presently preferred embodiments disclosed herein and indeed could be applied to any reprogrammable remote sensing or other computing device with a wireless communications facility For example, the foregoing disclosure of a presently preferred embodiment of the Intelligent Access Control System uses explanatory terms, such as mobile device, cellular system and wireless local area network and the like, which should not be construed so as to limit the scope of protection of the following claims, or to otherwise imply that the inventive aspects of the intelligent access control system are limited to the particular methods and apparatus disclosed. Moreover, as will be understood by those skilled in the art, many of the inventive aspects disclosed herein are based on software applications and operating systems running on generic hardware processing platforms. These functional entities are, in essence, programmable data collection, analysis, and storage devices that could take a variety of forms without departing from the inventive concepts disclosed herein. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above.

It is noted that, as used in this description, the singular forms "a," "an" and "the" include plural referents unless the context clearly dictates otherwise. Reference throughout this specification to "one aspect," "another aspect," "one embodiment," "an embodiment," "certain embodiment," or similar language means that a particular aspect, feature, structure, or characteristic described in connection with the embodiment is included in at least one embodiment of the present invention. Thus, appearances of the phrases "in one embodiment," "in at least one embodiment," "in an embodiment," "in certain embodiments," and similar language throughout this specification may, but do not necessarily, all refer to the same embodiment.

It will be apparent that various aspects of the present invention as related to certain embodiments may be implemented in software, hardware, application logic, or a combination of software, hardware, and application logic. The software, application logic and/or hardware may reside on a server, an electronic device, or be a service. If desired, part of the software, application logic and/or hardware may reside on an electronic device and part of the software, application logic and/or hardware may reside on a remote location, such as server.

In accordance with the teaching of the present invention and certain embodiments, a program or code may be noted as running on a computing device. A computing device is an article of manufacture. Examples of an article of manufacture include: a server, a mainframe computer, a mobile telephone, a multimedia-enabled smartphone, a tablet computer, a personal digital assistant, a personal computer, a laptop, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods. The article of manufacture (e.g., computing device) includes a non-transitory computer readable medium having a series of instructions, such as computer readable program steps encoded therein. In certain embodiments, the non-transitory computer readable medium includes one or more data repositories. The non-transitory computer readable medium includes corresponding computer readable program code and may include one or more data repositories. Processors access the computer readable program code encoded on the corresponding non-transitory computer readable mediums and execute one or more corresponding instructions.

Other hardware and software components and structures are also contemplated. Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

All statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

The invention claimed is:

1. A method comprising:
   activating a device to determine location information for the device;
   receiving at least one wireless connection request associated with a second device;
   controlling the device to prevent transmission of the location information for the device to the second device until the wireless connection request is determined to be authorized;
   comparing the wireless connection request to a plurality of authorized wireless connections to determine if the wireless connection request is associated with an authorized wireless connection; and
   allowing a communication session between the device and the second device if the wireless connection request is authorized.

2. The method of claim 1, wherein the wireless connection request is a WiFi connection request.

3. The method of claim 1, wherein the wireless connection request is a near-filed-communication connection request.

4. The method of claim 1, wherein the wireless connection request is a Bluetooth connection request.

5. The method of claim 1, wherein the wireless connection request is an RFID connection request.

6. A method comprising:
   activating a device to determine real identification information for the device;
   generating a mock identification information for the device;
   requesting a connection, from the device, to at least one of a network and a second device using the mock identification information;
   receiving standard connection messaging from at least one of the network and the second device;
   controlling the device to prevent transmission of the real identification information for the device to at least one of the network and the second device until the connection request is determined to be authorized;
   comparing at least one the network and the second device to at least one of a list of authorized networks and a list of authorized second devices to determine if at least one the network and the second device is authorized to connect to the device and start a communication session;

starting a communication session between the device and at least one the network and the second device if the connection request is authorized by re-announcing the device using the real identification information and the standard connection messaging.

7. The method of claim 6, wherein the network is a WiFi.

8. The method of claim 6, wherein the network is a NFC.

9. The method of claim 6, wherein the network is a RFID.

10. The method of claim 6, wherein the second device is Bluetooth enabled.

11. A wireless device comprising:

a control module, wherein the control module determines real identification information of the device and generates mock identification information for the device;

a plurality of transceivers, each transceiver including a transmitter and a receiver, wherein each transceiver is operably connected to the control module;

an intelligent access control (IAC) module operably connected to the control module, wherein the IAC module passively collects information about at least one of a network and a second device in proximity to the wireless device; and a memory module for storing information related to authorized networks and authorized second devices, wherein the control module prevents transmission of the real identification information and transmits the mock identification information to at least one of the network and the second device in order to receive standard connection messaging from at least one of the network and the second device, wherein the IAC module compares information collected about at least one of the network and the second device to determine if at least one of the network and the second device are authorized to communicate with the wireless device by comparing the information collected about at least one of the network and the second device to the stored information about the authorized networks and authorized second devices, and wherein the IAC module signals the control module to allow a communication session with at least one of the network and the second device if at least one of the network and the second device is authorized.

\* \* \* \* \*